United States Patent
Jaiswal et al.

(10) Patent No.: US 12,474,783 B1
(45) Date of Patent: Nov. 18, 2025

(54) FACE-TRACKING AND GESTURE RECOGNITION FOR HANDS-FREE COMPUTER CONTROL

(71) Applicant: Quinnipiac University, Hamden, CT (US)

(72) Inventors: Chetan Jaiswal, Hamden, CT (US); Michael Ruocco, Hamden, CT (US); Jack Duggan, Hamden, CT (US); Brian O'Neill, Hamden, CT (US); Karen Majeski, Hamden, CT (US)

(73) Assignee: Quinnipiac University, Hamden, CT (US)

( * ) Notice: Subject to any disclaimer, the term of this patent is extended or adjusted under 35 U.S.C. 154(b) by 0 days.

(21) Appl. No.: 18/922,718

(22) Filed: Oct. 22, 2024

(51) Int. Cl.
| | | |
|---|---|---|
| G06F 3/01 | (2006.01) | |
| G06F 3/04847 | (2022.01) | |
| G06K 9/00 | (2022.01) | |
| G06K 9/62 | (2022.01) | |
| G06V 40/16 | (2022.01) | |
| G06V 40/18 | (2022.01) | |
| G06V 40/20 | (2022.01) | |

(52) U.S. Cl.
CPC .............. *G06F 3/017* (2013.01); *G06F 3/012* (2013.01); *G06F 3/013* (2013.01); *G06F 3/04847* (2013.01); *G06V 40/171* (2022.01); *G06V 40/193* (2022.01); *G06V 40/20* (2022.01)

(58) Field of Classification Search
CPC .................................................... G06F 3/0482
See application file for complete search history.

(56) References Cited

U.S. PATENT DOCUMENTS

| | | | |
|---|---|---|---|
| 9,372,546 B2 | 6/2016 | Yin et al. | |
| 2016/0202756 A1* | 7/2016 | Wu .................. | G06F 3/0304 |
| | | | 382/103 |
| 2021/0240808 A1* | 8/2021 | Deore ................ | G06V 40/45 |
| 2021/0311556 A1* | 10/2021 | Topal ................ | G06V 40/169 |
| 2023/0252779 A1 | 8/2023 | Gonion et al. | |

OTHER PUBLICATIONS

M. Alruwaili, M. H. Siddiqi, M. N. Atta and M. Arif, "Deep learning and ubiquitous systems for disabled people detection using YOLO models," Computers in Human Behavior, vol. 154, 2024.
T. A. Lewis, "Working Definition of Ableism—Jan. 2022 Update," Jan. 2022. [Online]. Available: https://www.talilalewis.com/blog. [Accessed May 17, 2024].
K. M. Williams, The Cost of Turning Heads: The Design and Evaluation of Vocabulary Prompts on a Head-Worn Display to Support Persons with Aphasia in Conversation, College Park: M.S. thesis, University of Maryland, 2015.

(Continued)

*Primary Examiner* — Nan-Ying Yang
(74) *Attorney, Agent, or Firm* — Wiggin and Dana LLP

(57) ABSTRACT

Provided are systems and software to empower users with limited mobility hands-free interaction with a computer system. This hands-free interaction is achieved through the combined use of facial tracking and gesture recognition technologies, to enable precise and intuitive mouse control through the analysis of facial positioning and eye events. The systems and software are adaptable to diverse applications, encompassing general computing tasks, multimedia consumption, and entertainment.

29 Claims, 8 Drawing Sheets

(56) References Cited

OTHER PUBLICATIONS

D. C. Niehorster, R. Hessels and J. S. Benjamins, "GlassesViewer: Open-source software for viewing and analyzing data from the Tobii Pro Glasses 2 eye tracker," Behavior Research Methods, vol. 52, No. 3, pp. 1244-1253, Jun. 1, 2020.

J. Li, H. Li, W. Umer, H. Wang, X. Xing, S. Zhao and J. Hou, "Identification and classification of construction equipment operators' mental fatigue using wearable eye-tracking technology," Automation in Construction, vol. 109, 2020.

D. Rudi, P. Kiefer and M. Raubal, "The instructor assistant system (iASSYST)—utilizing eye tracking for commercial aviation training purposes," Ergonomics, vol. 63, No. 1, pp. 61-79, 2020.

K. Sharma, M. Giannakos and p. Dillenbourg, "Eye-tracking and artificial intelligence to enhance motivation and learning," Smart Learning Environments, vol. 7, No. 1, p. 13, 2020.

D. B. Carr and P. Grover, "The Role of Eye Tracking Technology in Assessing Older Driver Safety," Geriatrics, vol. 5, No. 2, 2020.

O. S. Torrabla, W. R. R. Dueñas and E. L. Solano, "Development of Voice-Based Tools for Accessibility to Computer Services," Computación y Sistemas, vol. 15, No. 1, pp. 7-15, Sep. 2011.

S. Hutt, A. Wong, A. Papoutsaki, R. S. Baker, J. I. Gold and C. Mills, "Webcam-based eye tracking to detect mind wandering and comprehension errors," Behavior Research Methods, vol. 56, No. 1, pp. 1-17, 2024.

J. Z. Lim, J. Mountstephens and J. Teo, "Emotion Recognition Using Eye-Tracking: Taxonomy, Review and Current Challenges," Sensors, vol. 20, No. 8, 2020.

H. Ansari, A. Dakhore, A. Paunikar, A. Khobragade, N. Ramteke and P. Sambhare, "Air Pose Canvas with Hand Pose Estimation using Machine Learning," IJCTET, vol. 12, No. 2, pp. 227-234, 2024.

K. Banerjee, A. Singh, N. Akhtar and I. Vats, "Machine-Learning-Based Accessibility System," SN Computer Science, vol. 5, No. 3, p. 294, 2024.

B. Alsharif, A. S. Altaher, A. Ahmed, M. Ilya and E. A. , "Deep Learning Technology to Recognize American Sign Language Alphabet," Sensors, vol. 23, No. 18, p. 7970, Sep. 2023.

A. Taheri, C. G. Gomez-Monroy, V. Borja and M. Sra, "MouseClicker: Exploring Tactile Feedback and Physical Agency for People with Hand Motor Impairments," Association for Computing Machinery, vol. 17, No. 1, 2024.

P. A. da Rocha Perris and F. da Fonseca de Souza, "Integrated Assistive Auxiliary System—Developing Low Cost Assistive Technology to Provide Computational Accessibility for Disabled People," in Universal Access in Human-Computer Interaction. Design Approaches and Supporting Technologies, 2020.

S. Fager, D. R. Beukelman, M. Fried-Oken, T. Jakobs and J. Baker, "Access interface strategies," Assistive Technology, vol. 24, No. 1, pp. 25-33, 2012.

T. Saia, R. Yaghmaian, R. Cuesta, C. Mueller and R. N. Pebdani, "A call to action for disability and rehabilitation research using a DisCrit and Disability Justice framework," Disability and Rehabilitation, pp. 1-7, 2023.

S. Mahmud, X. Lin and J.-H. Kim, "Interface for Human Machine Interaction for assistant devices: A Review," in 2020 10th Annual Computing and Communication Workshop and Conference (CCWC), 2020.

M. Ruocco, and J. Duggan, "'AccessiMove': Assistive Technology," in 28th Annual Consortium for Computing Sciences in Colleges Northeastern Conference (CCSCNE), poster abstract submitted on Mar. 7, 2024.

M. Ruocco, J. Duggan, C. Jaiswal, and B. O'neill, "AccessiMove," website created on Apr. 1, 2024. [Online]. Available: https://jdugganquinnipiac.github.io/AccessiMoveSite/. [Accessed Nov. 11, 2024].

M. Ruocco, and J. Duggan, "AccessiMove" in 28th Annual Consortium for Computing Sciences in Colleges Northeastern Conference (CCSCNE), poster presentation on Apr. 12, 2024.

M. Ruocco, J. Duggan, C. Jaiswal, B. O'Neill, and K. Majeski, "Leveraging AI Face-Tracking and Gesture Recognition for Hands-Free Computing: Bridging the Gap for Users with Physical Disabilities," manuscript submitted to IEEE Global Humanitarian Technology Conference (GHTC) on May 28, 2024.

\* cited by examiner

FACE-TRACKING AND GESTURE RECOGNITION FOR HANDS-FREE COMPUTER CONTROL

TECHNICAL FIELD

The present disclosure provides systems and software to empower users with limited hand mobility by providing hands-free interaction with a computer system. Through the combined use of facial tracking and gesture recognition technologies, the invention enables precise and intuitive mouse control through the analysis of facial positioning and eye events, such as blinks. The adaptability of the invention extends to diverse applications, encompassing general computing tasks, multimedia consumption, and entertainment.

BACKGROUND

In an era marked by technological innovation and digital advancement, the concept of accessibility has evolved beyond convenience to become a fundamental aspect of inclusivity and empowerment. For individuals with physical impairments (including, but not limited to, limited hand mobility, paralysis, limb deficiency, or amputation) traditional methods of computer interaction often present formidable barriers, hindering their ability to fully engage with and benefit from the digital world. Recognizing this pressing need for inclusive technological solutions, we introduce AccessiMove™, an innovative system and software designed to afford methods of hands-free computer control for such individuals. The present systems and methods are motivated by a desire to mitigate ableism in computer interaction.

In the realm of eye-tracking technologies, some solutions utilize head-worn displays and eye-tracking glasses or other specialized hardware. These tools offer assistive features for communication assistance and data visualization, showcasing advancements in wearable technology for individuals with aphasia and researchers studying eye movements. Other eye-tracking technologies have been tailored to more specific uses such as assisting in identification/classification of construction equipment, aviation training, enhanced learning, and assessing driving safety. Voice-based interfaces also present alternatives to traditional mouse and keyboard inputs for individuals with motor impairments. These technologies leverage vocal commands and speech recognition to enable hands-free interaction with computer systems, enhancing accessibility and usability for users with limited mobility. Other eye tracking technologies are not specifically designed for people with motor impairments; instead they are used to detect mind wandering and for attention, learning, and educational purposes, or to recognize user emotions using common eye/pupil patterns; however, these technologies have various limitations.

Advancements in gesture recognition and machine learning have potential to provide opportunities for intuitive digital interaction and accessibility enhancements. These systems utilize hand pose estimation, gesture recognition algorithms, and machine learning techniques to interpret user hand gestures and facilitate hands-free computing for individuals with visual impairments. Other gesture related technologies focus on assistance for those with hearing impairments, allowing for sign language recognition to translate and allow users to connect with others. While these systems provide assistance through hand gestures, the present invention differs from these solutions with a focus on persons with little to no arm mobility using directional head tilts for input (i.e. arrow keys, opening/closing on-screen-keyboard, etc.).

Tailored input devices, such as specialized computer mice, cater to the specific needs of individuals with hand motor impairments. These devices incorporate tactile feedback and physical agency to improve usability and accessibility, addressing challenges related to fine motor control and precision in computer interaction. Other adapted input devices include auxiliary assistive software with a sensor in the back of a chair's headrest to capture head movements to control the cursor, as well as applying pressure to the headrest to perform a click. Other head pointing strategies using direct access methods such as a head or mouth stick or infrared mouse tracking device provide additional means to access the computer in place of the use of one's hands.

Existing technologies fall short of a comprehensive and adaptable solution for computer control for individuals with limited moto abilities. The present invention provides a comprehensive and effective solution for affordable, hands-free computer control, catering to the diverse needs of individuals with limited mobility.

The present invention stands as a promising advancement in the field of assistive technology, demonstrating the feasibility and effectiveness of facial tracking and gesture recognition for hands-free computer control. The software not only addresses the specific needs of users with limited hand mobility but also contributes to the ongoing efforts to create more inclusive and accessible computing environments.

The present invention contributes to the field of assistive technology by addressing the unique needs of individuals with disabilities or limited mobility through innovative hands-free computer control solutions, and serves as a viable and improved alternative to many existing accessible computing tools already out there. The present invention meets the needs of its users with the intention of increasing inclusivity and reducing ableism in the digital landscape.

The purpose of the present invention is to provide a solution tailored to aid individuals with physical impairments, enabling them to interact with computers effectively. Furthermore, it is also designed for those who prefer alternative methods of computer operation, such as eye movements and gestures.

SUMMARY

The present invention generally provides systems and software to empower users with limited hand mobility by providing hands-free interaction with a computer. Through the combined use of facial tracking and gesture recognition technologies, the invention enables precise and intuitive mouse control through the analysis of facial positioning and eye closure events. Users can manipulate the on-screen cursor, facilitating a natural and responsive computing experience without reliance on traditional input devices. Moreover, the incorporation of gesture recognition technology allows users to execute actions and key presses by performing specific gestures, further enhancing the range of hands-free interactions. The software provides a user-friendly interface with customizable settings, catering to individual preferences and varying degrees of motor abilities. The adaptability of the invention extends to diverse applications, encompassing general computing tasks, multimedia consumption, and even entertainment.

In an embodiment, provided for are methods of computer operation, comprising:

accessing video of a computer user's face acquired by a camera input of a computer, wherein the video comprises a plurality of sequential frames;

identifying, from the plurality of sequential frames, facial landmarks of at least a first eye, a second eye, and a nose of the user;

monitoring, from at least two sequential frames, positional changes of facial landmarks of:

the first and second eyes to detect one or more of a closure of the first eye only, a closure of the second eye only, or a closure of both eyes, respectively defining independent input functions to the computer, and the nose to detect head movement of the user, wherein head movement of the user includes one or more head articulations defining one or more input functions to the computer; and operating the computer in at least two modes recognizing different inputs from the user, the at least two modes comprising:

a cursor-active mode enabling movement of a cursor on the screen of the computer in response to head movement of the user and disabling the one or more input functions associated with the one or more head articulations, and a cursor-inactive mode disabling movement of the cursor on the screen of the computer in response to head movement of the user and enabling the one or more input functions associated with the one or more head articulations.

In some embodiments, the at least two modes are toggled between by a mode-toggling gesture.

In some embodiments, the mode-toggling gesture is a closure of both eyes for a defined number of sequential frames or a defined period of time.

In some embodiments, the defined period of time is about 3 seconds.

In some embodiments, the facial landmark of the nose includes at least a nose bridge landmark.

In some embodiments, the camera is fixed in a position relative to the screen of the computer and faces the user.

In some embodiments, the camera is fixed in a position above the screen of the computer.

In some embodiments, the facial landmarks of the first and second eyes include a center of a respective upper eyelid ($P_1$) and a center of a respective lower eyelid ($P_2$).

In some embodiments, the closure of the first eye and the closure of the second eye are determined from a change in the distance between the respective upper and lower eyelids.

In some embodiments, the facial landmarks of the first and second eyes further include a point on the lower eyelid ($P_3$) lateral from the respective center of the lower eyelid ($P_2$).

In some embodiments, closure of the first eye and closure of the second eye are determined from changes in respective openness ratios calculated according to:

$$\text{openness ratio} = \frac{|P_1 - P_2|}{|P_2 - P_3|}.$$

In some embodiments, the method further comprises a cursor calibration step wherein head movement of the user is monitored while the user follows prompts to point their face at a center of the screen and four corners of the screen.

In some embodiments, the method further comprises a head articulation calibration wherein the user follows prompts to perform the one or more head articulations within their comfortable range of motion to set thresholds for triggering the one or more input functions associated with the one or more respective head articulations.

In some embodiments, the one or more head articulations comprise head nodding and head tilting.

In some embodiments, head nodding is defined by changes in an angle θ1 between an axis generally perpendicular to the computer screen and a vector between a facial landmark of the user's chin and a facial landmark of the user's nose.

In some embodiments, head tilting is defined by changes in an angle θ2 between an axis generally parallel to a vertical axis of the computer screen and a vector between a facial landmark of the user's chin and a facial landmark of the user's nose.

In some embodiments, the method does not include monitoring the movement of an eyeball of the first eye and second eye. In some embodiments, the method does not include monitoring the pupil position of an eyeball of the first eye and second eye.

In some embodiments the facial landmarks comprise:
one or more points on the upper eyelid of the first eye
one or more points on the upper eyelid of the second eye;
one or more points on the lower eyelid of the first eye;
one or more points on the lower eyelid of the second eye;
one or more points on the nose; and
one or more points near a boundary of the face including at least the chin.

In some embodiments, the facial landmarks consist essentially of:
one or more points on the upper eyelid of the first eye
one or more points on the upper eyelid of the second eye;
one or more points on the lower eyelid of the first eye;
one or more points on the lower eyelid of the second eye;
one or more points on the nose; and
one or more points near a boundary of the face including at least the chin.

In some embodiments, the facial landmarks consist of:
one or more points on the upper eyelid of the first eye
one or more points on the upper eyelid of the second eye;
one or more points on the lower eyelid of the first eye;
one or more points on the lower eyelid of the second eye;
one or more points on the nose; and
one or more points near a boundary of the face including at least the chin.

In some embodiments, the one or more points on the nose consist of the nose tip and the nose bridge.

In some embodiments, the method further comprises a third mode disabling movement of the cursor on the screen of the computer in response to head movement of the user and disabling the one or more input functions associated with the one or more head articulations.

In some embodiments, provided for are computer control systems, comprising:

computer control software for operating a computer, the computer having a display and a camera for capturing video of a user facing the display;

the computer control software operable to:

access video of a computer user's face acquired by the camera, wherein the video comprises a plurality of sequential frames;

identify, from the plurality of sequential frames, facial landmarks of at least a first eye, a second eye, and a nose of the user;

monitor, from at least two sequential frames, positional changes of facial landmarks of:

the first and second eyes to detect one or more of a closure of the first eye only, a closure of the second eye only, or a closure of both eyes, respectively defining independent input functions to the computer, and the nose to detect head movement of the user, wherein head movement of the user includes one or more head articulations defining one or more input functions to the computer; and operate the computer in at least two modes recognizing different inputs from the user, the at least two modes comprising:

a cursor-active mode enabling movement of a cursor on the screen of the computer in response to head movement of the user and disabling the one or more input functions associated with the one or more head articulations, and a cursor-inactive mode disabling movement of the cursor on the screen of the computer in response to head movement of the user and enabling the one or more input functions associated with the one or more head articulations.

In some embodiments, the computer control system comprises a graphical user interface.

In some embodiments, the graphical user interface comprises settings for mapping input functions to the computer.

In some embodiments, the graphical user interface comprises threshold adjustments for triggering input functions to the computer.

In some embodiments, the system further comprises cursor calibration wherein head movement of the user is monitored while the user follows prompts to point their face at a center of the screen and four corners of the screen. In some embodiments, the prompts are displayed in the graphical user interface.

BRIEF DESCRIPTION OF THE DRAWINGS

Aspects and advantages of the present disclosure will become apparent from the following exemplary embodiments taken in conjunction with the accompanying drawings, of which:

FIG. 4A depicts a gesture mapping menu for assigning computer inputs to head articulations. FIG. 4B depicts a threshold setting menu for assigning thresholds to head articulations.

DETAILED DESCRIPTION

Figure 1:
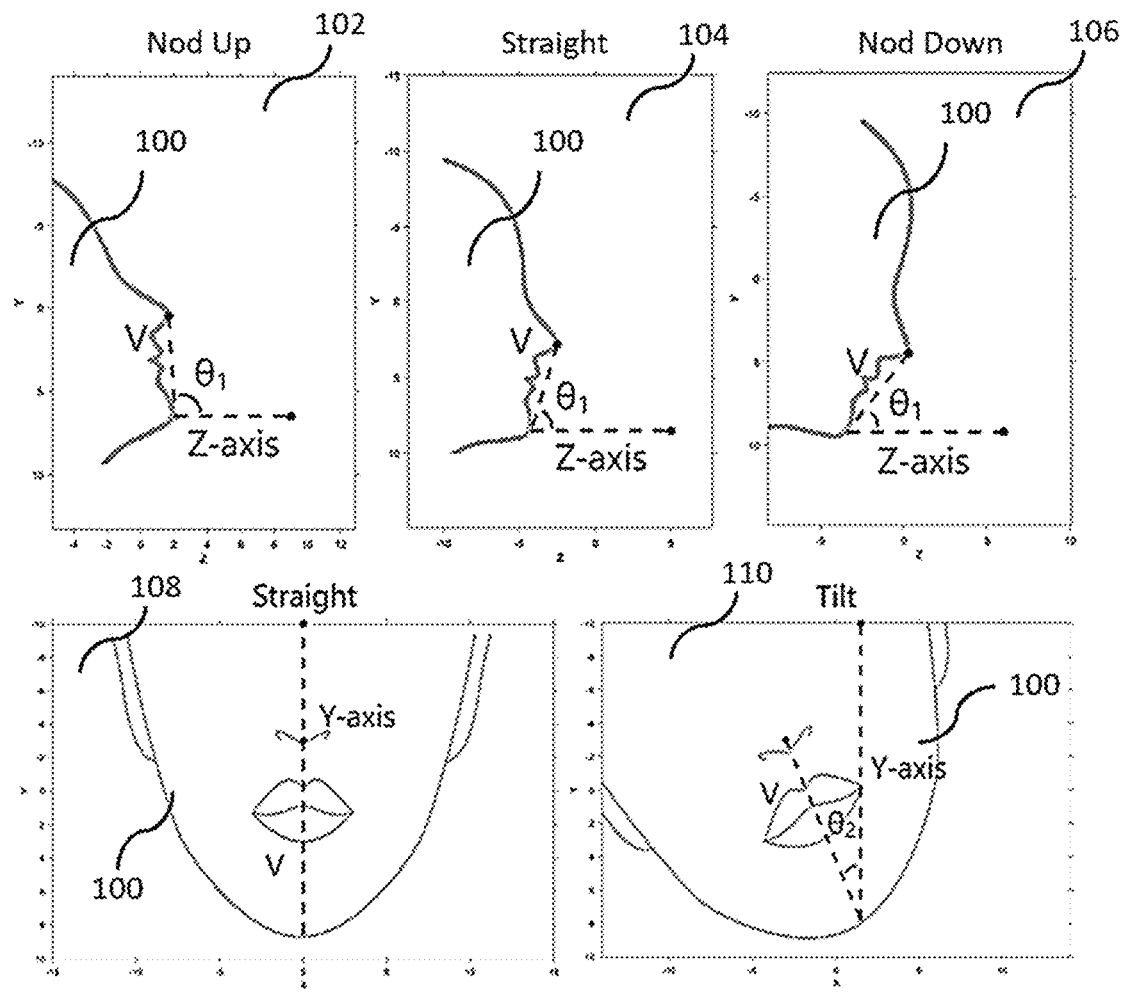
FIG. 1. An exemplary representation of head tilt/nod detection.

Provided are systems and software solutions designed to empower users with limited hand mobility by providing methods of hands-free interaction with a computer system. Hereinafter, for conciseness, these innovations are collectively referred to as "the system." Through the combined use of AI-based facial tracking and gesture recognition technologies (such as Google MediaPipe or others), the system enables precise and intuitive mouse control through the analysis of facial positioning and eye closure events such as blinks. Users can manipulate an on-screen cursor, facilitating a natural and responsive computing experience without reliance on traditional input devices. Moreover, the incorporation of gesture recognition technology allows users to execute actions and key presses by performing specific gestures, further enhancing the range of hands-free interactions. The software has user-friendly interface with customizable settings, catering to individual preferences and varying degrees of motor abilities. The system's adaptability extends to diverse applications, encompassing general computing tasks, multimedia consumption, and even entertainment. To validate the efficacy of the system, a user experience study was performed with the software, highlighting the software's positive impact on enhancing computer accessibility. See Examples, below. The findings underscore the potential of the system to empower individuals with physical impairments, promoting greater independence and engagement in the digital realm.

The system is an advancement in assistive technology, offering users with movement disabilities full control of their computer systems without reliance on traditional input devices. This system is an improvement on existing solutions, which are often tailored to specific computing activities or rely on costly external hardware. Through the integration of AI-based facial tracking and gesture recognition technologies, and using integrated or affordable webcams, the system enables precise and intuitive control of the on-screen cursor, empowering users to execute commands and interact with digital interfaces through slight head and neck movement and gestures.

Described herein are aspects of the software's design, functionalities, and its impact on enhancing accessibility and inclusivity in the digital realm. The systems herein represent an innovative model in the field of assistive technology, aimed at providing hands-free computer control for individuals with limited hand mobility. An important objective of the present invention is to provide users with a seamless and intuitive means of interacting with their computer systems, without the need for traditional input devices such as keyboards or mice.

The target audience encompasses individuals who face challenges in using conventional computer interfaces due to physical limitations, specifically those that would limit or prohibit the utilization of one's hands for complex motor movements. However, the audience of users is broader because it can be of interest for individuals without physical limitations who can benefit from its use, e.g, gamers, designers, investors, and others seeking alternative or further augmented means of computer control beyond or in addition to a conventional keyboard. By leveraging advanced technologies such as facial tracking and gesture recognition, the present invention aims, in an aspect, to empower users with enhanced accessibility and autonomy in navigating digital interfaces. An important aim of the present invention is, in an aspect, to foster inclusivity and equity in the digital realm, ensuring that individuals of all abilities have equal opportunities to engage with and benefit from technology.

Definitions

As used herein, for conciseness, "the system", "the methods", or like terms refer to any of the computer control methods, software, and system embodiments described herein. It should be appreciated that unless a phrase or section is expressly limited to a particular embodiment, that the described features apply to various embodiments of the disclosure.

As used herein, the term "computer" is intended to encompass generally any computing device operable by a user to perform computing tasks such as word processing, calculations, programming, internet browsing, gaming, communications, etc. Generally, the computer will have a direct or network connection to a display in the location of the user and a direct or network connection to a camera in the location of the user for capturing video of the user while the user is viewing the display. The captured video will generally have a plurality of sequential frames, and by analyzing positional changes of facial features of the user between sequential frames, the computer may be operated as described herein.

As used herein, the term "facial landmark" refers to points identified on the user's face in one or more video frames which correspond to a certain structural feature of the face. For example, a facial landmark may include a point on a nose of the user (e.g., nose bridge or nose tip or points therebetween), an eyelid of the user, a chin of the user, etc. By monitoring the positional change of the facial landmark(s), the user's head movement or other articulations/gestures may be utilized to control the computer. The "facial landmarks" may be identified by machine learning algorithm technologies such as Google MediaPipe or others.

As used herein, the term "positional change" refers to a change in position of a facial landmark between sequential frames of the video, for example between at least two sequential frames of the video. The amount, degree, or magnitude of positional change may be determined from a coordinate system applied to the video frames. Generally, any appropriate coordinate system may be implemented, such as cartesian or others.

The "facial landmarks" herein may advantageously exclude eyeball landmarks such as the pupil or iris, or other facial landmarks associated with movement of the eyeballs. Thereby, the user may move the cursor with head movements as detected by movement of the facial landmarks of the face. Because the user's eyes may move independently from the face of the user, this allows the user to move the cursor from the center of their field of vision so as to have an unobstructed view of the material they are viewing. Certain landmarks of the eyelid are used to detect blink or wink closures of the eyes to trigger certain inputs, however these landmarks to not correspond to eyeball movements and, advantageously, do not interrupt cursor movement.

The methods and systems herein may provide for "hands-free" computing. This does not necessarily mean that the methods and systems are incapable of recognizing hand movements for certain input gestures, but that the user generally does not need to interact with input devices such as a keyboard or mouse in order to operate the computer.

The term "nose" as used herein with respect to facial landmarks includes any features of the nose or any features generally located in the central region of the user's face. For example, the "nose" may include facial landmarks of the nose bridge and of the nose tip. Other facial landmarks of the "nose" could include nostrils, nose borders, the portion of the forehead at the top of the nose, etc. Advantageously, it has been found that the the nose, and in particular the nose bridge, provide for optimal cursor movement and usability in conjunction with methods and systems herein.

The term "mode" as used herein refers to different operational modes of the systems/methods which detect or are responsive to different inputs from the user. For example, a cursor-active mode may allow for movement of the cursor by tracking the facial movement of the user while disabling other inputs such as head articulations (e.g., nod or tilt inputs). In another example, a cursor-inactive mode does not allow for movement of the cursor but does allow for other inputs such as nods or tilts.

The term "boundary" of the face as used herein generally refers to the outer bounds of the face detected from the camera (i.e., from the perspective of the camera). Such boundary may include the chin or other facial boundary points. In some instances, the boundary may include the ears or other features observable from the perspective of the camera.

The term "consisting essentially of" generally means that the described embodiment does not contain additional elements which materially alter its functionality. For example, in the case where facial landmarks consist essentially of certain facial landmarks, such embodiments may include additional facial landmarks which do not materially improve or decrease functionality. In such embodiments, the minimum number of facial landmarks is identified for efficient implementation of the embodiment are generally listed, with the understanding that additional facial landmarks may have only marginal effects on functionality while reducing overall efficiency.

A. Exemplary Elements

The system is generally adaptable to any standard computer environment. While the software can be designed as a packaged executable that does not require libraries to be independently installed, exemplary libraries packaged within the executable are described. In general, while the software is intended to assist those with limited mobility in their extremities, it does require that users possess basic motor control over their head and neck.

1. Libraries

The system can utilize several different libraries to provide its advanced features. Facial tracking, a core functionality, can be enabled through Google's MediaPipe machine learning library, which itself uses OpenCV for video input processing. Other AI-based facial landmark recognition libraries may be utilized. This integration allows for precise analysis of facial landmarks, including orientation within the 3-dimensional plane, ensuring accurate tracking. Additionally, the system seamlessly integrates mouse and keyboard inputs using the pywin32 library, enabling users to interact with their computer systems hands-free. Graphics rendering can be managed by the Pygame and tkinter libraries, ensuring a visually appealing and intuitive interface for users. Finally, the system can utilize the asyncio library for asynchronous functioning, enhancing responsiveness and efficiency during user interactions.

2. Hardware

The system requires a webcam or other camera device capable of capturing video for facial tracking, preferably integrated above the screen for optimal performance. A built-in camera, as included with many modern laptops, is the preferred camera device and setup. The technology is intended to be useable with a wide range of hardware. The evaluation described in the user experience survey study of Example I was done on a hardware configuration featuring an Intel i5 processor with 8 GB of RAM. Using a device with similar or greater hardware specifications is expected to ensure smooth performance under typical usage scenarios.

3. Software

The present development was designed initially for use with Windows 11 due to its implementation of the taskbar-pinned TabTip keyboard. The TabTip keyboard is pinned to the taskbar to be able to open the on-screen keyboard using head gestures and can be enabled through Windows taskbar settings. Other on-screen keyboards may be utilized across various operating systems. The complete software program can be packaged as an executable, eliminating the need for separate library installations or Python interpreters. This executable can be achieved through PyInstaller, ensuring seamless deployment and usability for users. When installing the software, the directory can include this executable as well as an images folder that is placed within the executable's root directory.

4. Users

For full utilization of the system, users should possess basic motor control over their eyes and neck movements, as these fundamental controls are used for effective interaction with the software. Additionally, the ability to wink eyes individually is useful in making on-screen selection by 'clicking' via winking, although users lacking the ability to wink may be accommodated by alternative gestures or modes as described herein.

B. Calibration

To create an experience tailored to individual users, the system performs a calibration phase on boot up. This phase is comprised of two portions: (1) Obtaining the landmark coordinates needed for gaze-tracking (i.e., cursor movement), and (2) calculating angles between vectors created from the landmarks for tilt/nod head articulations. During the first portion, the user turns their whole head to face each corner of the screen, as well as the center of the screen. These provide the coordinates for the landmarks used in tracking the users gaze as described below. Additionally, this portion gathers the average gaze heights for when the user is looking at the top and bottom of the screen as determined by the y-values of the landmark coordinates whilst looking at the top vs. bottom corners of the screen. These averaged landmark heights are used to provide an additional check for the head tilt detection as detailed below.

In the second portion of the calibration phase, the user tilts their entire head up above the screen, down below the screen, as to the left and right sides to their comfort level. The system stores the angles the user's face makes with the camera as shown in FIG. 1. The system uses these stored angles to determine how far the user needs to tilt or nod their head to trigger an input. Different users may be comfortable moving their head to varying degrees and this process ensures that the system caters to their comfort and abilities.

C. Head Tilt Direction

The head tracking algorithm tracks when the user nods their head vertically (pitch) or tilts their head to the left or right sides (roll). By using the MediaPipe-generated landmarks for the tip of the nose ($P_1$) and the chin ($P_2$) the system defines multiple vectors. To detect these nods, we need to calculate the angles that the user's head makes with the camera. These angles only employ the yz-plane as the x-coordinate does not affect how the system detects vertical head movement. The system calculates this angle using linear algebra, specifically the equation to find the angle between two vectors:

$$\cos\theta = \frac{a \cdot b}{|a||b|}$$

where a and b are the vectors that the angle resides between. Rewriting to use a vector on the positive z-axis such as $$b = \begin{bmatrix} 0 \\ 1 \end{bmatrix}$$

this equation can be simplified as $$\theta = \cos^{-1}\left(\frac{a_z}{|a|}\right)$$

where $a = P_{1_{yz}}$ and $$|a| = \sqrt{a_y^2 + a_z^2}.$$

This same method is used to detect left and right head tilts that the user's head makes relative to the camera. Similarly, only the xy-plane is employed in this method as the distance between the face and the camera (the z-coordinate) is unnecessary to detect head tilts. Rewriting the previous equations to use the x and y values of $P_1$ and a vector on the positive y-axis such as $$b = \begin{bmatrix} 0 \\ 1 \end{bmatrix}$$

this equation can instead be expressed as $$\theta = \cos^{-1}\left(\frac{a_y}{|a|}\right)$$

where $a = P_{1_{xy}}$ and $$|a| = \sqrt{a_x^2 + a_y^2}.$$

FIG. 1 visualizes this method, showing a vector $V = \overrightarrow{P_1P_2}$ and additional vectors along the z-axis (nods) and y-axis (tilts) with $P_2$ as the origin then finding the angles between V and these axis vectors as $\theta_1$ and $\theta_2$ respectively. As the user changes the pitch or roll of their head these angles will increase/decrease past a set threshold allowing the system to detect that the user has performed a nod or tilt.

These head articulations can be generally visualized in FIG. 1, showing the face of the user 100 in different articulations which may trigger an input function to the computer. For example, when the head is in a straight position 104 with respect to nod motions in the the yz-plane, the angle $\theta_1$ between the Z-axis and the vector from the chin to nose tip of the user (V) has a determinable value. When the user nods up 102, the angle $\theta_1$ increases compared to the straight position 104. Alternatively, when the user nods down 106, the angle $\theta_1$ decreases compared to the straight position 104 It should be appreciated that additional or other angular measurements for these motions could be utilized. Likewise, when the head is in a straight position 108 with respect to tilt motions in the the xy-plane, the angle $\theta_2$ between the Y-axis and the vector from the chin to nose tip of the user (V) has a determinable value or is generally zero or close to zero in the straight 108. For some users having a posture which is not straight or a permanent neck bend, $\theta_2$ may take on values which are nonzero in the straight 108 position. When the user tilts their head (e.g., 110), $\theta_2$ will change by some degree from the Y-axis. It should be appreciated that certain input functions may utilize combined articulations (i.e., such as a diagonal-down-left, diagonal-down-right, diagonal-up-left, or diagonal-up-right) to trigger various inputs.

In testing we found that keeping these thresholds low allowed for a more fluid input experience for the user. However, the challenge with low thresholds is that tilting the head also triggers changes in the user's gaze. Subsequently, if the thresholds are too low, the system could mistakenly detect an up/down nod when the user is actually only adjusting their gaze to the top or bottom edge of the screen in order to navigate the cursor near one of those edges. For this reason, the software has at least two separate modes: a gaze-tracking mode (i.e., a cursor-active mode) and a key-input mode (i.e., a cursor-inactive mode). In gaze-tracking mode, the head-tilt thresholds are high, requiring the user to tilt their head above or below the screen. The system can perform an additional check with gaze-tracking to make sure the gaze has gone beyond the top or bottom of the screen by using the calibrated average gaze heights for the top and bottom of the screen as determined during calibration. The check verifies that the user's gaze height is not within the range of the two calculated edges before allowing the head-tilt detection to perform inputs; otherwise, the user is assumed to be moving the cursor. In key-input mode, the thresholds are reduced, the additional checks for screen edges are disabled, and gaze-tracking is disabled, allowing the user to perform nod and tilt actions more simply without accidentally moving and clicking the cursor. Users can toggle between these modes by performing a mode-toggling gesture such as a long blink (as detailed in the following section), or other gesture, or by using a selectable option in the graphical user interface.

D. Eye Tracking

An important feature of the system is detection of individual winks, allowing users the ability to left/right click and make selections whilst navigating using the cursor. To start the process of detecting when a user's eye(s) close, the system first uses MediaPipe to detect facial landmarks around the eye (but not of the eyeball, such as pupils or iris), specifically the center of the upper eyelid ($P_1$), center of the lower eyelid ($P_2$), and an additional point on the lower eyelid lateral to the center point ($P_3$). By calculating two distances $D_1=|P_1-P_2|$ and $D_2=|P_2-P_3|$ we create the $$\text{openness ratio } \frac{D_1}{D_2}$$

that fluctuates depending on how open the eye is (FIG. 2.).

Figure 2A:
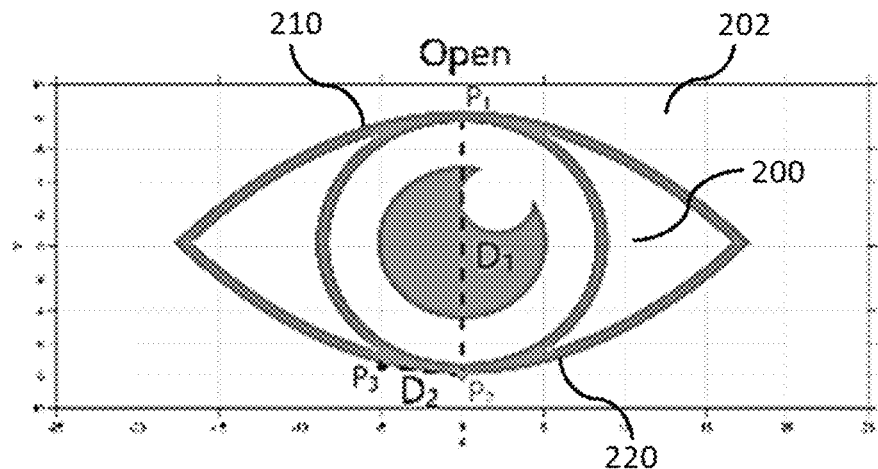
FIGS. 2A-2B. Exemplary representations of eye "openness" detection (i.e., detection of eye closure). An eye is depicted in open (FIG. 2A) and closing (FIG. 2B) states.
Figure 2B:
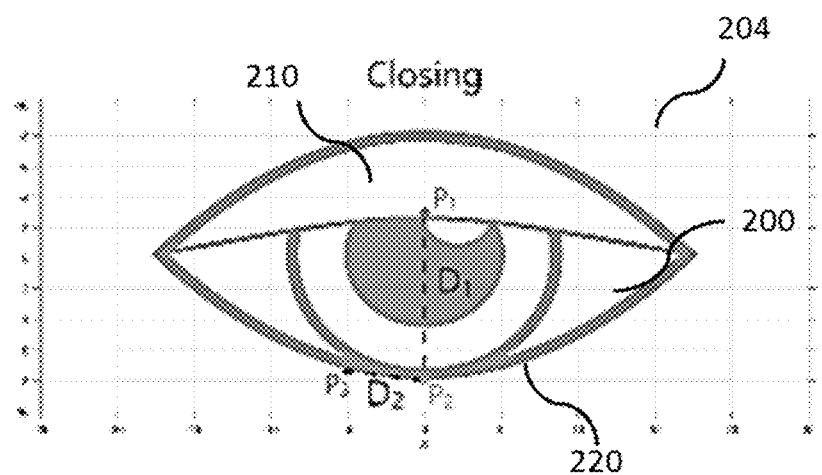

FIG. 2 generally depicts these points on open (FIG. 2A) and closing (FIG. 2B) eye diagrams. In the open 202 position, the eye 200 will have the upper eyelid 210 and lower eyelid 220 separated by a distance $D_1$ as measured by the distance between the center point $P_1$ of the upper eyelid 210 and the center point $P_2$ of the lower eyelid 220. The lower eyelid 220 also contains a lateral point $P_3$ as described herein which is a measurable distance $D_2$ from $P_2$. The openness ratio calculated based upon these points varies frame-to-frame when eye movement is occurring, for example during closing 204 of the eye 200.

In the opennessratio defined above, $D_2$ fluctuates in only two ways, firstly by the distance the user's eye is from the camera and secondly by the horizontal angle $\overrightarrow{P_1P_2}$ makes with the camera. In the former case, there is no impact on the overall ratio as all three points will simultaneously change their distance with the camera in any scenario, creating a non-distance-dependent solution. This is the main justification for calculating the $D_2$ distance, as $D_1$ is not viable on its own to distinguish eye-closing events from the effects of moving closer to or further away from the camera. In the second case, $D_2$ changing due to the horizontal angle, the denominator of the openness ratio will decrease as the camera interprets these points as being closer together in the absence of a z-coordinate. This works to our advantage. as looking away to the side then increases the ratio resulting in a larger detected openness ratio. This is beneficial to the program overall as we only want to detect user actions while the user is facing the camera.

Similarly, the value of $D_1$ can fluctuate only two ways, through the closing of the eye or by the vertical angle made between the eye and the camera. The former is the intended method of detection, with $D_1$ decreasing as the eye closes resulting in a smaller ratio necessary to go below the desired threshold to detect a closed eye. The change in vertical angle also decreases the value of $D_1$ as the camera will detect these points as being closer together when the user tilts their head up or down to the point that they are no longer facing the camera. To mitigate this effect and reduce the possibility of false inputs, the threshold used is small enough to where the vertical angle needed to go below the threshold would result in a face positioning beyond what MediaPipe could detect.

It is possible for the software to mis-classify a user closing both of their eyes (blinking) as only closing one eye (winking), resulting in a false input. When the user begins to close both eyes, the frame that is captured can contain landmark points that are beyond the threshold for one eye but not the other. This is usually the result of one of the following: the eyelids not closing at the same exact time, the eyelids not closing at the same exact rate, the head being tilted up or down a large amount, or minor inaccuracies in landmark positions. To help reduce these false inputs, we employ a frame counter to ensure the interpreted action (a blink or wink) exists for multiple frames in a row. The number of frames needed to reliably ensure minimal false inputs depends on the performance of the program on a given device, with higher performing devices needing a higher number of frames to ensure accuracy. In the testing performed on a low-mid level performance device, as described above, a count of at least two frames was found to be sufficient. Due to the potential variability in performance, we use system time to measure the length of time in which both user's eyes are closed, with a time of greater than one second being used to differentiate between normal blinks and long blinking to switch between gaze-tracking mode and key-input mode.

E. Bridge Tracking

It is common for existing software solutions to use eye pupils to determine gaze. When designing the system, we found this approach to be flawed for two reasons: First, constantly having the cursor in front of where the user is attempting to focus can create a distracting experience and can lead to unintentional cursor movements. Second, it can be difficult to accurately track pupil movements using some lower quality web cameras, as pupil landmarks are harder to accurately determine, as opposed to eyelid and other facial landmarks. For these reasons, the movement of the pupils (or iris or eyeballs in general) is not utilized in tracking gaze.

Figure 3:
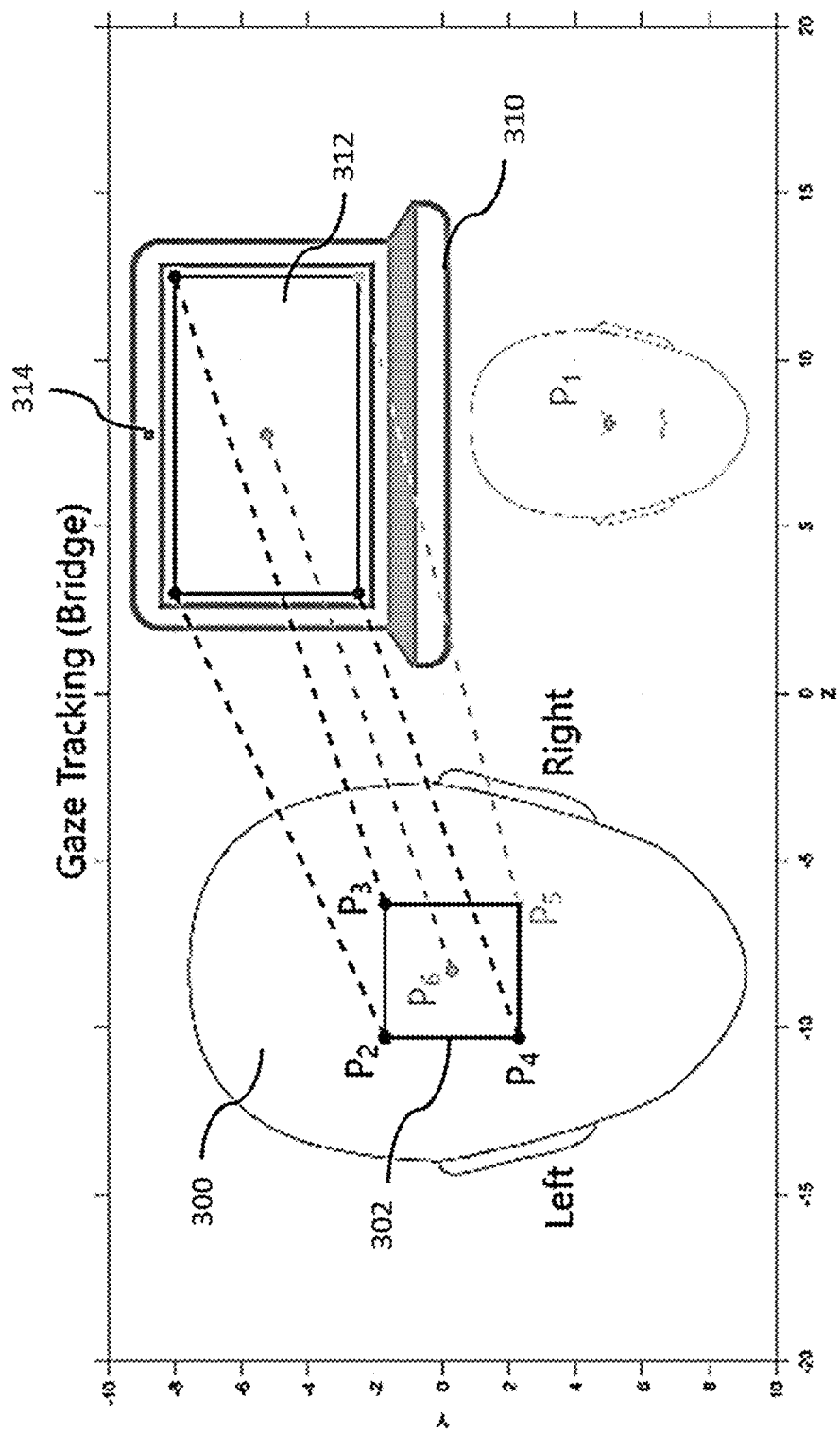
FIG. 3. An exemplary representation of calibration via nose bridge tracking from a behind the head perspective.

Instead, gaze tracking for cursor movement relies on a landmark of the nose (such as the nose bridge). During the calibration phase, the user is prompted to turn their face to point at the corners and center of the screen. The MediaPipe-detected landmark for the bridge of the nose ($P_1$) is utilized to obtain five additional points ($P_2$, $P_3$, $P_4$, $P_5$, and $P_6$) where each point represents where the bridge of the nose was at whilst the user was looking at each corner and the center of the screen. The coordinates of each of these points are then mapped to the screen dimensions using linear interpolation. This procedure is depicted generally in FIG. 3. The user's face 300, and particularly a landmark of the face such as the nose bridge (point $P_1$) will generate a position map 302 associated with the screen 312 of the computer 310 as detected by the camera 314 thereof. Based upon this calibration, the user may move the cursor by head movement as described further below.

As the user moves $P_1$ through the "window" created between the calibrated points, the corresponding coordinates on the screen are obtained. These screen coordinates can further be used to update the on-screen cursor by continuously moving its position towards these coordinates. This solution is dependent on the distance between the user and the camera, requiring that the user maintain a similar distance as they did during calibration. If a steady distance were not maintained, then as the user moves away from the camera, the differences in the user's position in the captured frame would appear smaller, and as the user approaches the camera, they would likewise appear greater. This ultimately would reduce or increase the sensitivity of the cursor on the screen with a higher sensitivity while closer to the camera, and a lower sensitivity while farther away from the camera. This can be corrected by obtaining the distance the user is from the screen and using it to scale the obtained screen coordinates. While this would potentially increase accuracy for users who tend to lean forward or back whilst on the computer, it would also add additional calculations, potentially impacting performance. For the use-cases the system was designed for, we expect that the user will not change their distance from the camera to such a great extent that any changes in the ability to interpret their gaze cannot be corrected by the user utilizing the on-screen cursor as a visual guide as to where to face to get the desired movement.

Additionally, a smoothing effect on the cursor can be used to create a more controllable and visually appealing experience. Without this smoothing effect, the frequent cursor movements can appear sporadic and be difficult to control as it is practically impossible for the user to keeps their head entirely still in a single position, while making larger head movements causes the cursor to visually "jump" to the new position instead of gliding. By adding an additional smoothing value, the distance the cursor moves each update is determined by how great the distance has changed from the users current and previous position with greater changes corresponding to larger distance updates for the cursor and a visually faster cursor speed. When user movements are minimal the cursor moves slower, allowing for more precise control making it easier to make selections.

F. Settings

While calibration allows the system to acquire an in-depth understanding of a user's head and facial movements to make generally accurate estimations of their actions, some users may find that the values encoded from calibration do not coincide with their preferred sensitivity. The system provides users with a comprehensive settings menu (e.g., FIG. 4) so that they can customize their experience. Within this menu, individuals have the freedom to fine-tune sensitivity thresholds for head tilts, catering to diverse levels of neck mobility or desired sensitivity levels. Moreover, users can assign specific functions to each directional head tilt, such as activating the on-screen keyboard, executing arrow key commands, or accessing the settings menu itself. This customization capability ensures that the system adapts seamlessly to individual preferences, enhancing user control and accessibility.

Figure 4A:
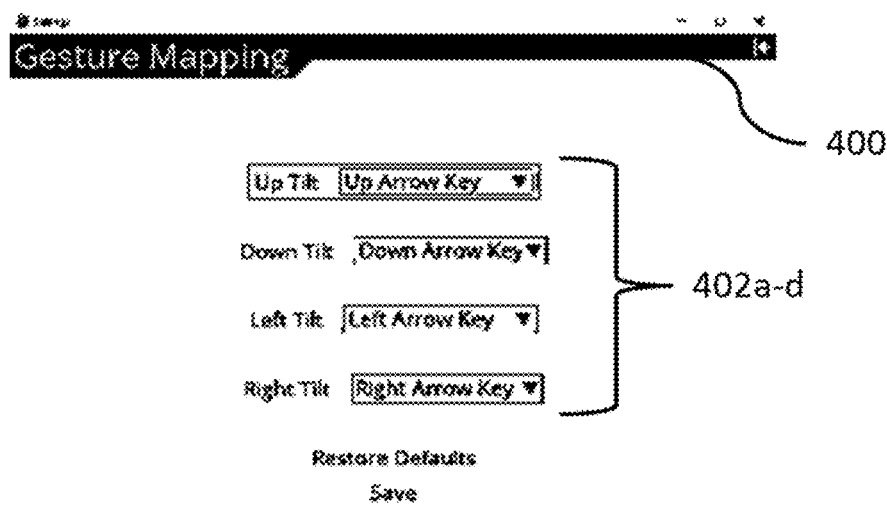
FIGS. 4A-4B. Exemplary settings menus displayed in exemplary graphical user interfaces of the computer control system.

For example, FIG. 4A shows a first customization menu for gesture mapping 400 where various user inputs may be mapped to functions of the computer. For example, as shown in FIG. 4A, four head articulations are shown (up tilt (i.e., nod up), down tilt (i.e., nod down), left tilt, and right tilt) with four respective assigned inputs 402a-d, respectively. In the example of FIG. 4A, these articulations are assigned to typical keyboard keys up, down, left, and right arrows. In a particular gesture map 400, the user may alter the assignments to customize their experience. Additionally, as described herein, one or more gesture maps 400 may be associated with a togglable mode such that different togglable modes may have one or more associated gesture maps 400. For example, one mode may have the assignments 402a-d as shown in FIG. 4A, while another mode may have these articulations assigned to different input functions. Users may also update these assignments on-the-fly or as necessary to effectively operate a computer.

Figure 4B:
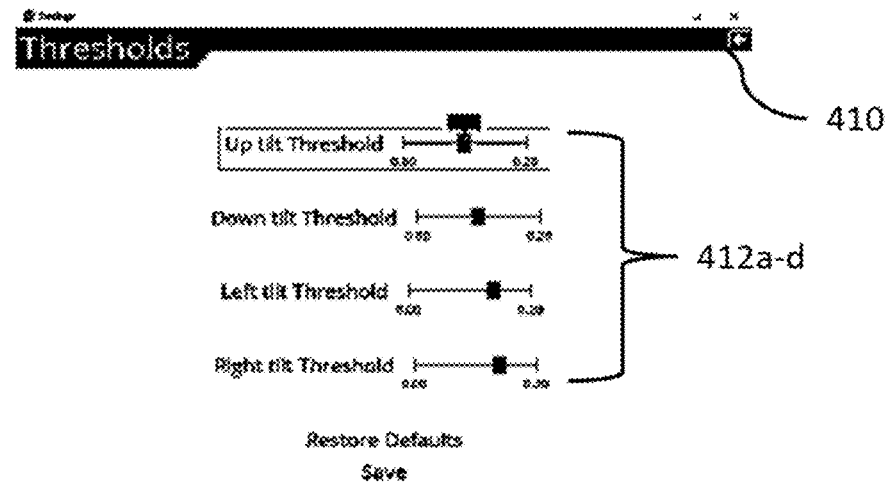

For a set of given inputs or head articulations, the user may also monitor thresholds of these articulations which trigger an input to the computer. FIG. 4B shows a thresholds menu 410 which contains customizable thresholds 412a-d for the exemplary head articulations shown. The thresholds may be customized for each articulation which is especially important for users having limited movement in the direction of one or more of the articulations, but less limited movement in other articulations. The software may also have selectable user profiles so that multiple users may save their customized settings associated with their profile.

G. Exemplary Methods and Systems

Figure 7:
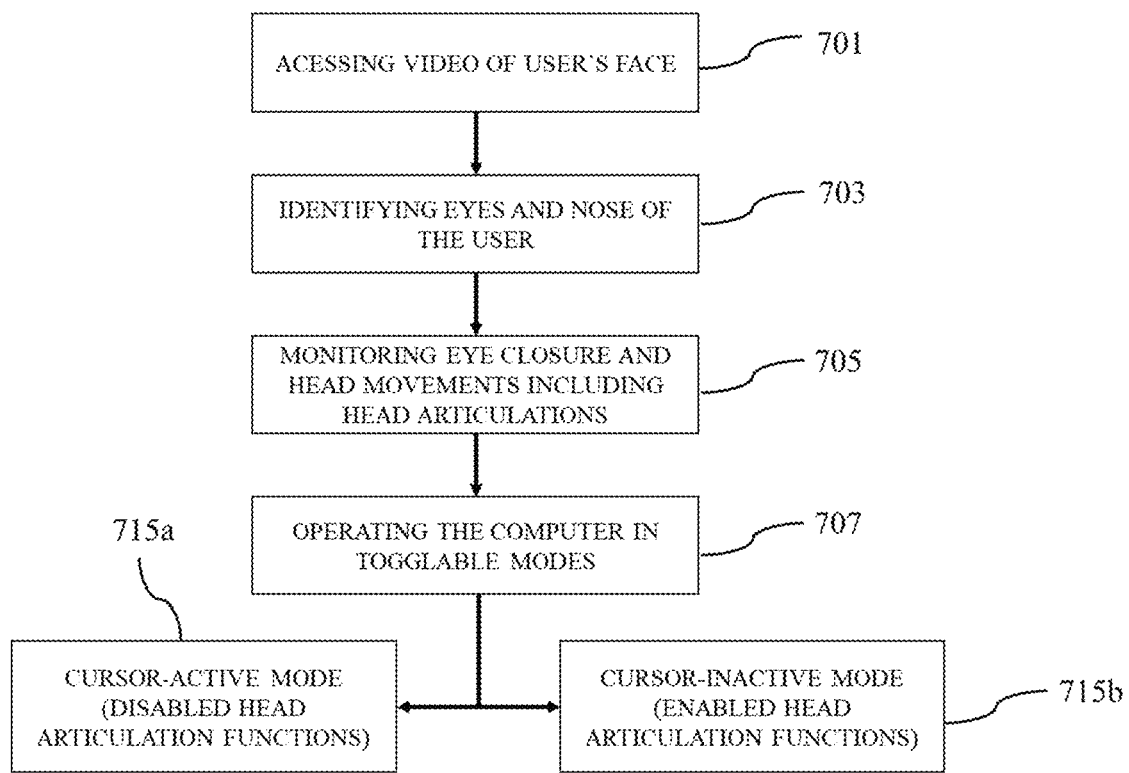
FIG. 7. Flow diagram of an exemplary computer control method.

In various embodiments, provided for are methods of computer operation as shown in the exemplary embodiment of FIG. 7. Generally, such methods include accessing video of a computer user's face acquired by a camera input of a computer 701. The video generally comprises a plurality of sequential frames. In various embodiments, at least a subset of the plurality of sequential frames are analyzed to identify facial landmarks of at least a first eye, a second eye, and a nose of the user 703. In some embodiments, the facial landmarks of the first eye and second eye include facial landmarks of the eyelids. In some embodiments, the facial landmarks of the first eye and second eye do not include landmarks of the pupil, iris, or other portions of the eyeball. As explained herein, avoiding such landmarks of the eyeball can be advantageous.

Positional changes of identified landmarks (or of a subset of identified landmarks) may be monitored 705. For example, facial landmarks of the first and second eyes may be monitored to detect one or more of a closure of the first eye only, a closure of the second eye only, or a closure of both eyes, which respectively define independent input functions to the computer. For example, a closure of the left eye (i.e., wink) may correspond to a left click on a typical computer mouse, a closure of the right eye (i.e., wink) may correspond to a right click on a typical computer mouse, and a closure of both eyes (i.e., blink). In addition to the eyes, facial landmarks of the nose are generally monitored to detect face or head movement of the user. In various embodiments, head movement of the user includes general head movement (i.e., to move the cursor) as well as one or more head articulations defining one or more input functions to the computer. These head articulations can include tilting or nodding, or any other articulation of the head which is detectable to trigger a function of the computer control program.

As described herein, in various embodiments, cursor control and head articulations are difficult to implement in a single operating mode, especially for users having limited mobility of the head/neck. This is because low thresholds for head articulations may be mis-identified as general cursor movements, or general cursor movements may be mis-identified as head articulations triggering a different input function. Additionally, head articulations even when properly identified may cause erratic cursor movement which impacts the user experience. To solve this problem, two or more togglable modes may be implemented under which the computer is operated 707.

The two or more togglable modes generally include a cursor-active mode 715a and a cursor-inactive mode 715b. As shown in FIG. 7, these two modes are connected with a double-ended arrow indicating that the user may switch between these modes during operation. The system or methods may default (by program default or user preference) to a first mode 715a or 715b when initially loaded, or may allow the user to select an initial mode for operation. In various embodiments, in the cursor-active mode 715a, movement of a cursor on the screen of the computer in response to head movement of the user is enabled, and the one or more input functions associated with the one or more head articulations are disabled. In various embodiments, in the cursor-inactive mode 715b, movement of the cursor on the screen of the computer in response to head movement of the user is disabled and the one or more input functions associated with the one or more head articulations are enabled. The user may generally toggle between modes using a mode-toggling gesture (such as a long blink or other recognizable gesture which is not a head nod or tilt or other head articulation). The user may also toggle between modes using a button or option in a graphical user interface of the computer control program.

In further embodiments, one or more additional modes may be included. For example, a third mode may deactivate all inputs except for a mode-toggling gesture such that the user may move freely without affecting the computer operation (for example, for long periods of inactivity such as watching a movie). Due to the limited number of head articulations available, additional mode(s) may provide different mappings of the head articulations such that a head nod or tilt has different input effects across different modes. The active mode may be displayed in the graphical user interface, may be accessible by the cursor as a menu hidden from the desktop, or may be overlaid on the display to always show the active mode by number or other recognizable symbol.

Figure 8:
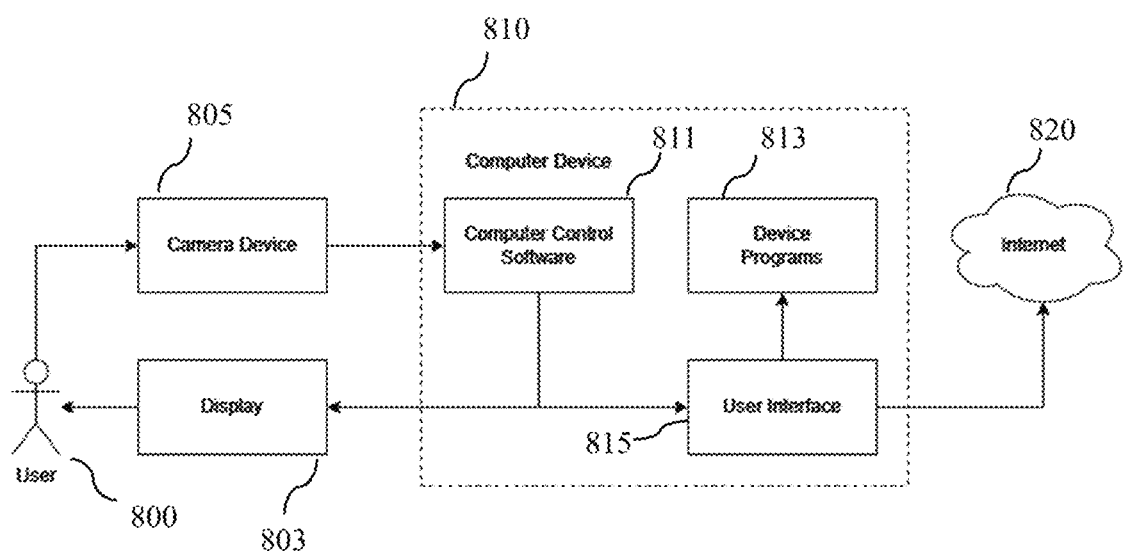
FIG. 8. Diagram of an exemplary computer control system.

Provided for herein are systems which implement the computer control methods and software described herein, as shown in the exemplary embodiment of FIG. 8. In general, a user 800 will generally have access to a display 803 of the computer. In various embodiments, the computer may be a local or network computer. While the user 800 is facing the display 803, their face will be visible to a camera device 805. The camera device 805 may be fixed in position relative to the display 803, such as in a laptop or tablet webcam, or may be movable or otherwise positionable relative to the display 803 in order to capture the face of the user 800. It is generally preferable (but not required) for the camera 805 to be located above the display 803 and centered horizontally.

The computer device 810 may be a desktop computer, laptop computer, tablet, smartphone, or other device having general computing capabilities requiring user input. The computer device will generally be running computer control software 811 which operates in the native operating system of the computer device 810 to provide the user interface 815 functions described herein. In real-time, the user 800 will observe from display 803 the effect of their face/head movements to move the cursor or produce other functions as described herein. The user interface 815 may also include calibration features as described herein or settings for movement thresholds, preferences, etc. In general, the user interface 815 allows the user 800 to perform any computer functions which are typically accessible using a keyboard and mouse, such as operating system functions, running other device programs 815 such as word processors, internet browsers, etc., or performing other tasks such as gaming. While not required, the computer may have an internet connection 820 for various computing functions. Alternatively, the user may use a local computer device 810 to operate a remote computer (not shown) over the internet connection 820 where the computer control software 811 is running on either the local computer (in which case user interface 815 commands are sent over the internet) or remote computer (in which case camera device 805 input is sent over the internet to the remote computer). As will be appreciated from the various embodiments herein, systems such as FIG. 8 may take various forms so as to provide an accessible or hands-free computer operation experience to the user 800.

H. Advantages

While there are other solutions to assist motor impaired individuals with computer interaction, the present invention serves as a significant advance in assistive technology via its ability to stand-out as an innovative solution for hands-free computer navigation. By combining a multitude of features together, the system stands as an all-in-one solution increasing its practicality over similar solutions. This is done through the incorporation of a unique and intuitive form of gaze-tracking that utilizes the bridge of the nose in combination with wink and head-tilt detection usable in two or more readily togglable modes. Additionally, the system was designed with user adaptability in mind by allowing the user to calibrate and customize settings for increased usability. Other features such as the ability to run as a startup application and the quick on-screen keyboard provide additional convenience to users and increase accessibility. These features can be implemented on a minimal hardware setup, only requiring a display and a camera. This configuration is commonplace and can be seen as economical opposed to other solutions that rely on additional external devices.

In various embodiments, additional accessibility features may be incorporated. In an embodiment, voice-to-text features may be activated by speech, such as by the user stating a key word, phrase, or command. In an embodiment, voice-to-text features are incorporated which allow for the user to trigger voice-to-text with a computer input function, such as a head nod or tilt. Voice-to-text generally allows users to input text by speaking, which is particularly valuable for individuals with limited motor function. This feature ensures that spoken words are transcribed accurately into text. In an embodiment, voice-to-text is used for generating text such as in a word processing program. In alternative embodiments, voice commands may be used as computer input functions, such as those which are assignable to head articulations such as nods/tilts.

In further embodiments, screen zoom functionality may be incorporated. A screen zoom functionality generally magnifies on-screen content, making it more accessible to users with visual impairments as well as allowing for more precise selection via eye-tracking. The screen zoom feature may appear as a picture-in-picture panel overlaying the computer desktop. Alternatively, the entire desktop may be magnified. The screen zoom feature may be generally enabled by an input function such as one tied to a head articulation.

In further embodiments, a predictive keyboard functionality may be incorporated. The predictive keyboard feature generally predicts and suggests words or phrases as users input text to help aid users with limited motor control by reducing the number of inputs required when using the on-screen keyboard.

EXAMPLES

The following examples further describe and demonstrate embodiments within the scope of the present invention. The Examples are given solely for purpose of illustration and are not to be construed as limitations of the present invention, as many variations thereof are possible without departing from the spirit and scope of the invention.

User Experience Survey Study:

To evaluate the effectiveness of the disclosed computer control system and methods (hereinafter referred to as "the system"), a user experience survey study was designed where participants were asked to perform several tasks using the system and then answer survey questions about their experience. This user experience study focused on general usability and participants recruited did not have any motor impairments. Further assessments of the software will include participants who do have limited mobility.

Participants initially underwent a thorough pre-study briefing, where they were acquainted with the study's objectives, procedures, and consent process. This session allowed for any questions or concerns to be addressed before proceeding. Following this, participants provided verbal informed consent to partake in the study, ensuring ethical participation. Next, participants received an in-depth introduction to the system familiarizing them with its features, functionalities, and purpose. Through demonstrations by the researcher, participants saw how the system facilitates hands-free computer control. During these demonstrations, one of the researchers went through the calibration phase, opened a web browser, used a search engine with the on-screen TabTip keyboard, and played Snake using head-tilts to interact with the game. (Snake is a simple game in which you move a snake with the objective of collecting as many items as possible without hitting a wall or another part of the snake. Players can only move the snake in the four cardinal directions.) Participants observed these task demonstrations and were offered an opportunity for any further questions about the system or the tasks carried out by the researcher. Participants then independently executed each of these same tasks (calibration, opening a web browser, using a search engine with the online keyboard, and playing Snake) using the system, under the guidance of the researcher. Researchers observed participants' interactions with the software, and any difficulties encountered were noted for assessment. After completing all tasks, participants were invited to provide feedback through a structured survey, sharing their subjective impressions and opinions on the system. This survey gave users the ability to evaluate the software using a six-point Likert scale. Areas of focus included ease of calibration, performance, reliability, user friendliness, and accuracy. Additionally, participants used the same scale to rate the system's potential in being used for computer navigation, web navigation, media viewing, assisting motor impaired users, and gaming.

Figure 5:
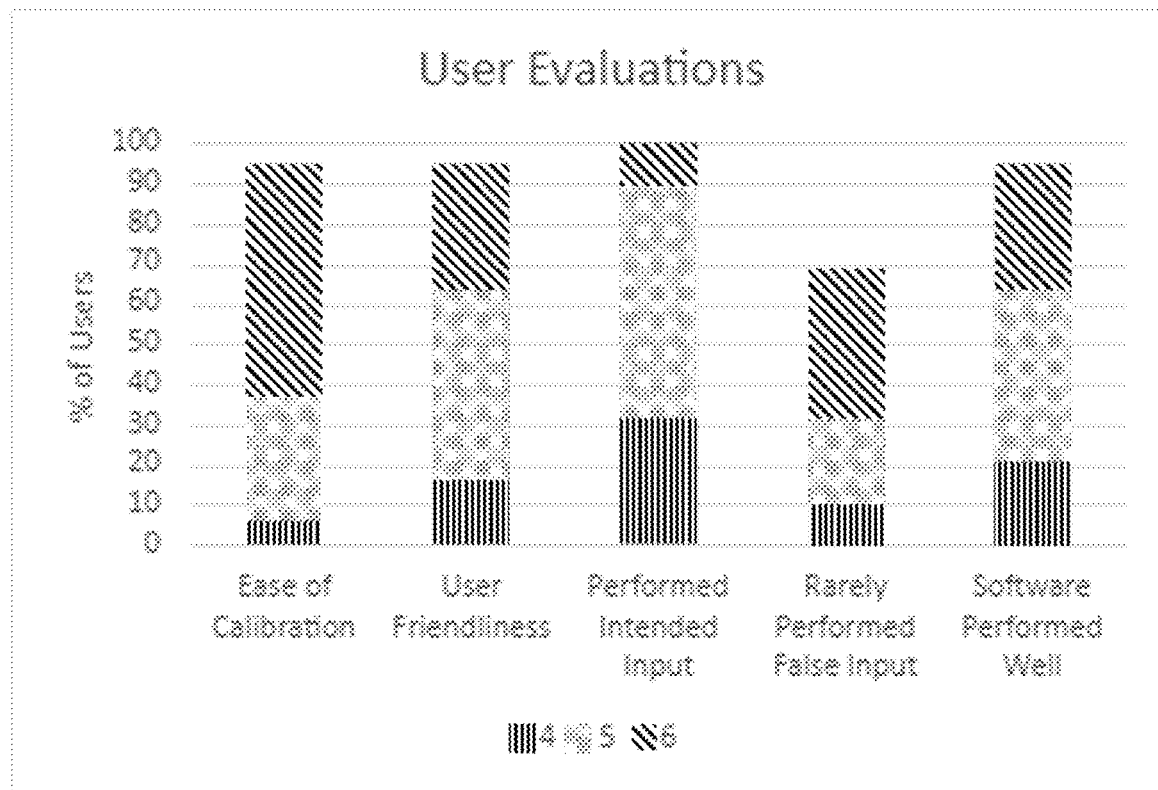
FIG. 5. Results of user experience survey questions on software performance.

A subject population of 19 participants performed the tasks described above and took the post-session survey. Based on participant feedback, the system is a viable solution for delivering a hands-free experience when interacting with a computer. FIG. 5 shows the results of the first five Likert scale questions, where users were asked to rate the case of calibration, user-friendliness, performance of intended inputs and false inputs, and overall performance of the tool. FIG. 5 shows the percentage of participants who answered with a 4 (blue), 5 (orange), or 6 (gray) in these questions, where a 6 indicated complete agreement with the statement. Participant feedback shows that the system is easy to calibrate, user-friendly, and performs well. The greatest areas of interest based upon participant feedback concern the ability to perform the intended input and the performance of false inputs. While 100% of participants at least partially agreed (4 or better) with the statement "The software reliably performed the inputs I was attempting to execute", only 68% (13/19) agreed with the statement "The software rarely performed false inputs." Most importantly, these results give insight into the system's ability to detect the user's intended actions and prevent the detection of unintended actions. The biggest issue noted by participants were these false inputs, such as the system mistakenly identifying a user as performing an action when no action is present, or when the execution of some action was unintentional. These issues may potentially become less frequent as the user familiarizes themselves with the system, as there may be a learning curve present. Additionally, expert users will have a better understanding of the tunable movement thresholds that the system provides to avoid false inputs in large or altogether. The results show that the system is a reliable and accurate solution that utilizes minimal hardware and software.

Figure 6:
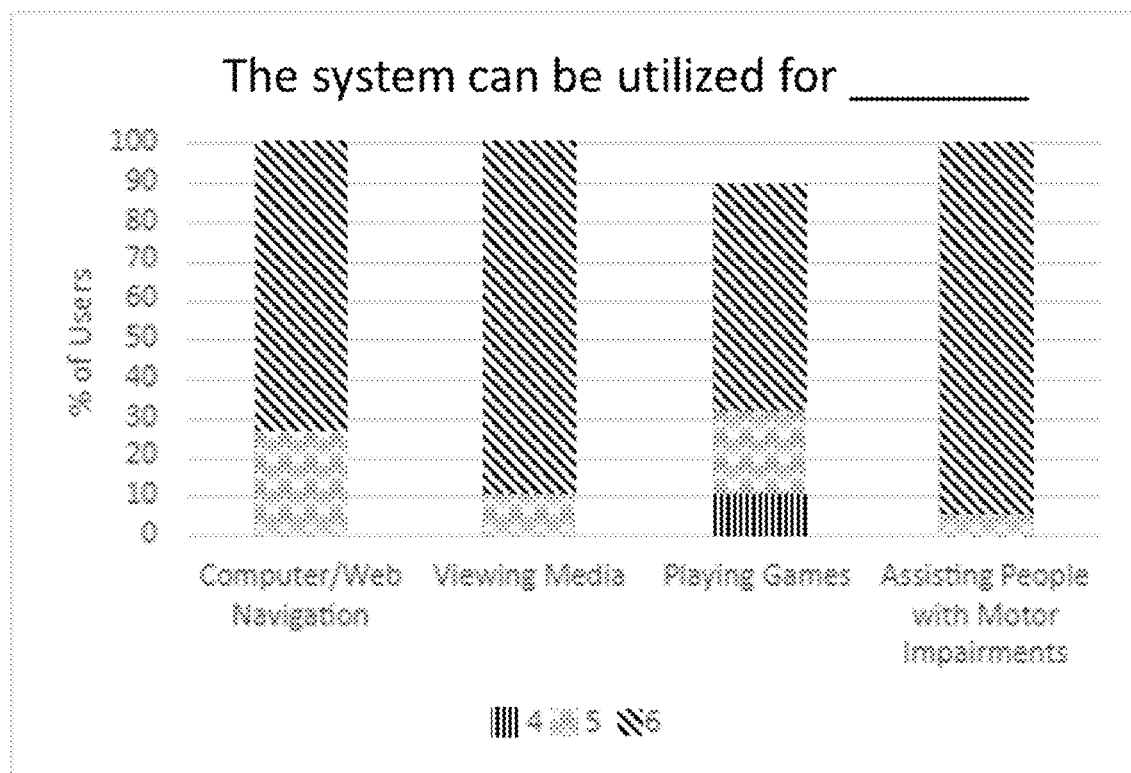
FIG. 6. Results of user experience survey questions on software applications and overall use.

FIG. 6 shows the results of the four Likert scale questions focusing on the potential for using the system with various applications-computer/web navigation, viewing media, and gaming. The final question asks whether users agree with the statement "I believe this software can be used to assist those with motor impairments in operating a computer." Again, the figure shows the percentage of participants who answered with a 4 (blue), 5 (orange), or 6 (gray) in these questions, where a 6 indicated complete agreement with the statement. Participant feedback shows that the system can be used for its intended applications, with the only possible exception being its potential for gaming. However, it is expected that this metric would improve as users become more accustomed to using the system. Still, 89% of participants (17/19) still considered the system generally applicable to gaming, with 11 of the 19 participants completely agreeing with the statement "This software has the potential to be utilized for gaming effectively." Ultimately, 18 of the 19 participants completely agreed with the statement "I believe this software can be used to assist those with motor impairments in operating a computer," with the remaining participant giving a 5 out of 6 on this question. Overall, the results are promising and demonstrate the potential the system has regarding creating an exceptional user experience.

INCORPORATION BY REFERENCE

The entire disclosure of each of the patent documents, including certificates of correction, patent application documents, scientific articles, governmental reports, websites, and other references referred to herein is incorporated by reference herein in its entirety for all purposes. In case of a conflict in terminology, the present specification controls.

EQUIVALENTS

The invention can be embodied in other specific forms without departing from the spirit or essential characteristics thereof. The foregoing embodiments are to be considered in all respects illustrative rather than limiting on the invention described herein. In the various embodiments of the systems and methods of the present invention, where the term comprises is used with respect to the recited components of the systems compositions or steps of the methods, it is also contemplated that the systems and methods consist essentially of, or consist of, the recited components or steps. Furthermore, it should be understood that the order of steps or order for performing certain actions is immaterial so long as the invention remains operable. Moreover, two or more steps or actions can be conducted simultaneously.

In the specification, the singular forms also include the plural forms, unless the context clearly dictates otherwise. Unless defined otherwise, all technical and scientific terms used herein have the same meaning as commonly understood by one of ordinary skill in the art to which this invention belongs. In the case of conflict, the present specification will control.

What is claimed is:

1. A method of computer operation, comprising:
    accessing video of a computer user's face acquired by a camera input of a computer, wherein the video comprises a plurality of sequential frames;
    identifying, from the plurality of sequential frames, facial landmarks of at least a first eye, a second eye, and a nose of the user;
    monitoring, from at least two sequential frames, positional changes of facial landmarks of:
        the first and second eyes to detect one or more of a closure of the first eye only, a closure of the second eye only, or a closure of both eyes, respectively defining independent input functions to the computer, and
        the nose to detect head movement of the user, wherein head movement of the user includes one or more head articulations defining one or more input functions to the computer; and
    operating the computer in at least two modes recognizing different inputs from the user, the at least two modes comprising:
        a cursor-active mode enabling movement of a cursor on the screen of the computer in response to head movement of the user and disabling the one or more input functions associated with the one or more head articulations, and
        a cursor-inactive mode disabling movement of the cursor on the screen of the computer in response to head movement of the user and enabling the one or more input functions associated with the one or more head articulations.

2. The method of claim 1, wherein the at least two modes are toggled between by a mode-toggling gesture.

3. The method of claim 2, wherein the mode-toggling gesture is a closure of both eyes for a defined number of sequential frames or a defined period of time.

4. The method of claim 3, wherein the defined period of time is about 3 seconds.

5. The method of claim 1, wherein the facial landmark of the nose includes at least a nose bridge landmark.

6. The method of claim 1, wherein the camera is fixed in a position relative to the screen of the computer and faces the user.

7. The method of claim 6, wherein the camera is fixed in a position above the screen of the computer.

8. The method of claim 1, wherein the facial landmarks of the first and second eyes include a center of a respective upper eyelid ($P_1$) and a center of a respective lower eyelid ($P_2$).

9. The method of claim 8, wherein the closure of the first eye and the closure of the second eye are determined from a change in the distance between the respective upper and lower eyelids.

10. The method of claim 8, wherein the facial landmarks of the first and second eyes further include a point on the lower eyelid ($P_3$) lateral from the respective center of the lower eyelid ($P_2$).

11. The method of claim 10, wherein closure of the first eye and closure of the second eye are determined from changes in respective openness ratios calculated according to:

$$\text{openness ratio} = \frac{|P_1 - P_2|}{|P_2 - P_3|}.$$

12. The method of claim 1, further comprising a cursor calibration wherein head movement of the user is monitored while the user follows prompts to point their face at a center of the screen and four corners of the screen.

13. The method of claim 1, further comprising a head articulation calibration wherein the user follows prompts to perform the one or more head articulations within their comfortable range of motion to set thresholds for triggering the one or more input functions associated with the one or more respective head articulations.

14. The method of claim 1, wherein the one or more head articulations comprise head nodding and head tilting.

15. The method of claim 14, wherein head nodding is defined by changes in an angle $\theta_1$ between an axis generally perpendicular to the computer screen and a vector between a facial landmark of the user's chin and a facial landmark of the user's nose.

16. The method of claim 14, wherein head tilting is defined by changes in an angle $\theta_2$ between an axis generally parallel to a vertical axis of the computer screen and a vector between a facial landmark of the user's chin and a facial landmark of the user's nose.

17. The method of claim 1, wherein the method does not include monitoring the movement of an eyeball of the first eye and second eye.

18. The method of claim 17, wherein the method does not include monitoring the pupil position of an eyeball of the first eye and second eye.

19. The method of claim 1, wherein the facial landmarks comprise:
    one or more points on the upper eyelid of the first eye
    one or more points on the upper eyelid of the second eye;
    one or more points on the lower eyelid of the first eye;

one or more points on the lower eyelid of the second eye;
one or more points on the nose; and
one or more points near a boundary of the face including at least the chin.

20. The method of claim 1, wherein the facial landmarks consist essentially of:
one or more points on the upper eyelid of the first eye
one or more points on the upper eyelid of the second eye;
one or more points on the lower eyelid of the first eye;
one or more points on the lower eyelid of the second eye;
one or more points on the nose; and
one or more points near a boundary of the face including at least the chin.

21. The method of claim 1, wherein the facial landmarks consist of:
one or more points on the upper eyelid of the first eye
one or more points on the upper eyelid of the second eye;
one or more points on the lower eyelid of the first eye;
one or more points on the lower eyelid of the second eye;
one or more points on the nose; and
one or more points near a boundary of the face including at least the chin.

22. The method of claim 21, wherein the one or more points on the nose consist of the nose tip and the nose bridge.

23. The method of claim 1 further comprising a third mode disabling movement of the cursor on the screen of the computer in response to head movement of the user and disabling the one or more input functions associated with the one or more head articulations.

24. A computer control system, comprising:
computer control software for operating a computer, the computer having a display and a camera for capturing video of a user facing the display;
the computer control software operable to:
access video of a computer user's face acquired by the camera, wherein the video comprises a plurality of sequential frames;
identify, from the plurality of sequential frames, facial landmarks of at least a first eye, a second eye, and a nose of the user;
monitor, from at least two sequential frames, positional changes of facial landmarks of:
the first and second eyes to detect one or more of a closure of the first eye only, a closure of the second eye only, or a closure of both eyes, respectively defining independent input functions to the computer, and
the nose to detect head movement of the user, wherein head movement of the user includes one or more head articulations defining one or more input functions to the computer; and
operate the computer in at least two modes recognizing different inputs from the user, the at least two modes comprising:
a cursor-active mode enabling movement of a cursor on the screen of the computer in response to head movement of the user and disabling the one or more input functions associated with the one or more head articulations, and
a cursor-inactive mode disabling movement of the cursor on the screen of the computer in response to head movement of the user and enabling the one or more input functions associated with the one or more head articulations.

25. The system of claim 24, wherein the computer control system comprises a graphical user interface.

26. The system of claim 24, wherein the graphical user interface comprises settings for mapping input functions to the computer.

27. The system of claim 24, wherein the graphical user interface comprises threshold adjustments for triggering input functions to the computer.

28. The system of claim 24, further comprising a cursor calibration wherein head movement of the user is monitored while the user follows prompts to point their face at a center of the screen and four corners of the screen.

29. The system of claim 24, wherein the prompts are displayed in the graphical user interface.

* * * * *